April 1, 1941. T. W. DEAKERS ET AL Re. 21,757

COSMETIC DEVICE

Original Filed Sept. 10, 1938 2 Sheets-Sheet 1

INVENTORS
THORPE W. DEAKERS
LLOYD A. SCHMUCKER

BY Merriam, Anderson & Liddy
ATTORNEYS

April 1, 1941. T. W. DEAKERS ET AL Re. 21,757

COSMETIC DEVICE

Original Filed Sept. 10, 1938 2 Sheets-Sheet 2

INVENTORS
THORPE W. DEAKERS
LLOYD A. SCHMUCKER

BY
Munn, Anderson & Liddy
ATTORNEYS

Reissued Apr. 1, 1941 Re. 21,757

UNITED STATES PATENT OFFICE 21,757

COSMETIC DEVICE

Thorpe W. Deakers, Los Angeles, Calif., and Lloyd A. Schmucker, deceased, late of Los Angeles, Calif., by Marguerite Schmucker, administratrix, Los Angeles, Calif.

Original No. 2,193,509, dated March 12, 1940, Serial No. 229,342, September 10, 1938. Application for reissue August 4, 1940, Serial No. 351,428

8 Claims. (Cl. 132—79)

This invention relates generally to cosmetology, and more particularly to lip rouge, mascara, eye shadow and other cosmetic preparations.

An object of the invention is to provide a device structurally characterized in an extremely novel and ingenious manner enabling a cosmetic or other preparation to be directly applied to the part to be treated, without smearing or waste of the preparation and in the relatively small quantity thereof by which most natural and artistic effects can be obtained, all to the end of eliminating the use of fingers or applicators in place of a blunt or worn lipstick which cannot be manipulated to accurately apply the rouge but must be supplemented by the fingers as a highly inefficient and messy substitute to spread and shape a dab of the rouge on the lips.

Another object of the invention is to provide a cosmetic device of the above described character embodying a novel form of applicator, which in its operative association with a cosmetic stick or body provides an extremely desirable and compact unitary structure, and enables a thin film of the cosmetic to be removed from the body thereof automatically by the applicator when manipulated with respect to the cosmetic body in a predetermined manner, all while precluding any messy or inaccurate distribution of the cosmetic from the applicator, and utilizing the entire body of cosmetic economically and without waste.

A further object of the invention is to provide a cosmetic device wherein the aforestated applicator operates when manipulated with respect to the cosmetic body, to effectively mill the crystalline structure of the body so as to actually increase its fineness and thus improve its quality.

Still another object of the invention is to provide a cosmetic device wherein the receptacle or holder for the cosmetic body and the applicator form a permanent unit, with which the cosmetic body is removably associated in the manner of a refill cartridge, and is adapted to be acted upon by the applicator until the body is completely used.

With these and other objects in view, the invention resides in the combinations, arrangements, and functional relationships of elements as set forth in the following specification and particularly pointed out in the appended claims.

Figure 5:
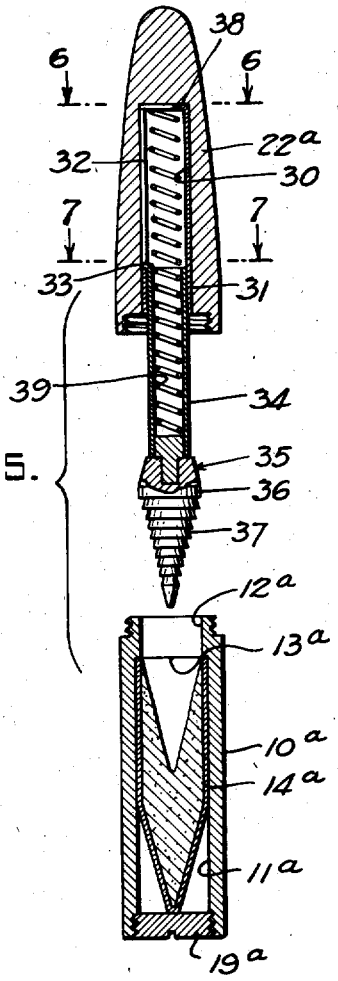
Fig. 5 is a view similar to Fig. 4 and showing the open position of the device.
Figure 8:
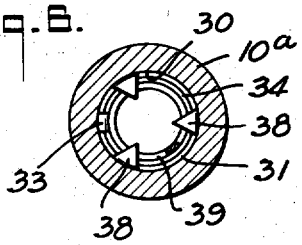
Figure 7:
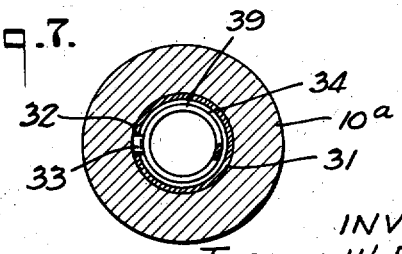

Figs. 6 and 7 are transverse sectional views taken, respectively, on the lines 6—6 and 7—7 of Fig. 5.

Figure 1:
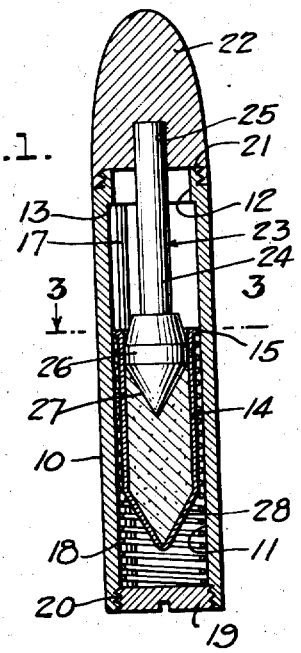
Fig. 1 is a longitudinal sectional view of one form of cosmetic device embodying the invention, and showing the closed position of the device.
Figure 2:
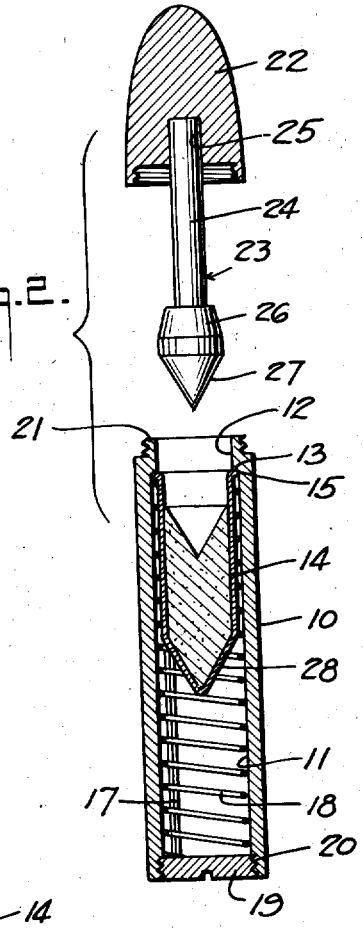
Fig. 2 is a view similar to Fig. 1 and showing the open position of the device.
Figure 3:
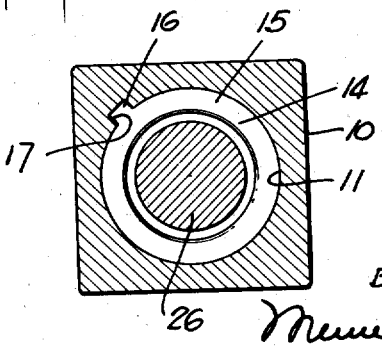
Fig. 3 is a transverse sectional view taken on the line 3—3 of Fig. 1.

Referring specifically to the drawings, and particularly to Figs. 1 to 3, inclusive, the invention comprises an elongated receptacle 10 having a cylindrical bore 11 reduced slightly in diameter adjacent one end as indicated at 12 to form an annular stop shoulder 13 for a cosmetic holder 14 in the form of a metallic, cylindrical refill cartridge loosely fitting the bore 11 and having a flange 15 at one end adapted to abut the shoulder 13.

The flange 15 is provided with a lug 16 adapted to work in a longitudinal groove 17 in the wall of the bore so as to confine the holder to movement axially in the bore. A coil spring 18 is freely received in the bore 11 so as to surround the holder 14 with one end of the spring abutting the flange 15. The other end of the spring abuts a removable plug 19 screwed at 20 into the other end of the bore so as to co-act with the flange 15 in urging the holder outwardly of the bore to the extreme position shown in Fig. 2 and limited by the shoulder 13.

The receptacle is provided at one end with a collar 21 threaded externally for engagement by internal threads of a closure 22 in the form of a streamlined cap to which is fixed an applicator 23 composed of a stem 24 rigidly secured in a socket 25 in the applicator, and a head 26 of an external diameter to have a relatively close fit in the holder 14 for a purpose to be later described.

The head 26 can be of a soft material, such as a soft wood, and is of a generally conical form as indicated at 27 so as to taper at an angle such as to be most conveniently applied to the lips, it being found in practice that an included angle of approximately sixty degrees is very satisfactory in enabling cosmetic to be accurately and artistically applied to the lips.

The bottom end 28 of the holder 14 is of generally conical form complementary to the conical portion 27 of the applicator head 26 for co-action therewith in a manner to be described in the operation of the invention, which is as follows:

Let it be assumed that the closure 22 is applied to the receptacle 10 as shown in Fig. 1, from which it will be seen that the applicator 23 has forced the cosmetic holder 14 axially in the receptacle 10 against the action of the spring 18, by engagement of the head 26 of the applicator with the body of lip rouge or other preparation with which the holder is supplied. Thus the spring acts to maintain the cosmetic in contact with the head 26 so that upon unscrewing the closure 22 from the receptacle, the head will have a rotary wiping action upon the cosmetic so that milling of the latter will be effected, with an increase in the fineness of the crystalline structure of such a preparation, and hence an improvement in the quality thereof.

This wiping action due to the rotation of the head in unscrewing the closure 22 will also insure that a relatively thin film of the cosmetic has been transferred to the head. The relatively close fit of the head in the holder 14 prevents any excess quantity of cosmetic being transferred to the head so as to obviate waste of the cosmetic and permit the latter to be artistically applied to the lips in a relatively thin film so as not to destroy the natural appearance of the lips. As the cosmetic is contained wholly within the receptacle at all times, the danger of smudging the clothes and other articles is eliminated. Furthermore, the small quantity of cosmetic on the applicator head can be more easily manipulated without being brought into contact with anything but the lips, so as to entirely obviate any messy condition resulting from the use of the cosmetic.

Upon returning the applicator 23 to the receptacle 10 by screwing the closure 22 thereon, the holder 14 is moved axially by the head 26 to again load the spring 18, and a reverse rotary wiping motion of the head upon the cosmetic with which it is in contact, is effected, thus again producing a milling action upon the crystalline structure of the cosmetic with the advantages previously pointed out.

It will be noted that due to the conical end 28 of the holder 14, complementary to the conical portion 27 of the head 26, the latter will remove cosmetic from the holder until the cosmetic is exhausted, thus avoiding the waste of the preparation, which entails a considerable loss in the case of expensive products.

Figure 4:
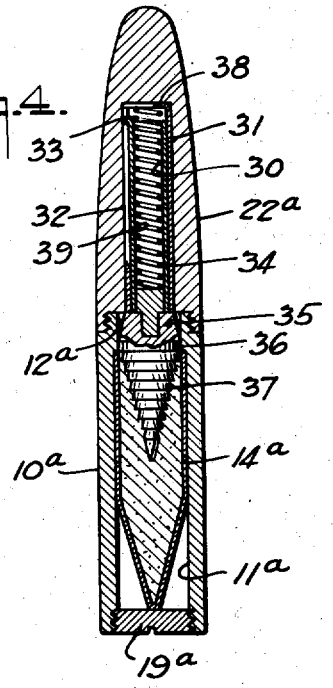
Fig. 4 is a longitudinal sectional view of a modified form of cosmetic device embodying the invention, and showing the closed position of the device.

Reference will now be had to Figs. 4 and 7, inclusive, wherein the invention is shown to comprise a receptacle 10a having a cylindrical bore 11a, one end of which is reduced in diameter at 12a to form an annular stop shoulder 13a against which the open end of a cosmetic holder 14a abuts. The holder 14a is a renewable refill cartridge of cylindrical form and is confined against displacement in the bore 11a by a plug 19a screwed into the opposite end of the bore at 20a.

The first mentioned end of the receptacle is provided with an externally threaded collar 12a on which is adapted to be screwed an internally threaded closure 22a in the form of a stream-lined cap having a longitudinal bore 30 in which is force-fitted a metallic barrel 31. The barrel 31 is provided with a longitudinal groove 32 in which works a lug 33 on the hollow stem 34 of an applicator 35, the stem being freely slidable in the barrel 31 and carrying a head 36 of elongated tapered form which is divided into a series of annular steps 37 around its periphery, and is particularly adapted for use in applying mascara and eye shadow preparations.

Contained within the stem 34 and abutting the head 36 and a number of prongs 38 inbent from the inner end of the barrel 31, is a coil spring 39 which urges the applicator 35 to the extreme position shown in Fig. 5 for co-action with the holder 14a in a manner identical to that of the applicator 23 described in the operation of the first form of the invention.

From the foregoing description, it will be clear that the same principle is involved in both forms of the invention, as in a broad sense, both applicators and their respective cosmetic holders are relatively movable and are relatively urged towards each other in the applied position of the applicators to the receptacles, so as to automatically transfer the substance of the cosmetic in the holders to the applicators until the contents of the holders are exhausted, all in a manner to obviate contamination of the body of cosmetic and smearing of the latter on the clothes and other articles.

We claim:

1. A device of the class described comprising a receptacle having a bore and a longitudinal groove in the wall of the bore; a tubular cosmetic holder movably mounted in the bore and having a lug working in said groove to confine the holder to axial movement; a spring in the bore urging the holder outwardly thereof to one extreme position; a closure having screw-threaded connection with the receptacle; and an applicator fixed to the closure and having a head adapted to enter said holder by contact with the contents thereof, and to reversely move the holder against the action of said urging means.

2. A cosmetic device comprising a receptacle having a bore; a tubular cosmetic holder supported in said bore; a closure having screw-threaded connection with the receptacle; an applicator having a head, and movably mounted in the closure so as to be confined to axial movement therein; and a spring in the closure urging the applicator to one extreme position from which it is adapted to be moved by contact of the head with cosmetic in said holder.

3. An applicator having an applicator head of generally conical form divided into a series of annular steps on its peripheral surface.

4. A device of the class described comprising an elongated outer receptacle having a longitudinal bore extending from one end of said receptacle, a closure for said end of said receptacle, means removably mounting said closure upon said receptacle requiring rotative movement between said receptacle and said closure to disengage them, an applicator rigid with said closure and extending into said bore when said closure is engaged upon said receptacle, an elongated inner container for holding a supply of cosmetic slidably mounted within said bore and having an open end disposed toward said one end of said receptacle, means urging said container toward said end of said bore to press the cosmetic into contact with said applicator, and means interengaging said receptacle and said container to prevent relative rotary movement between them whereby rotation of said closure to disengage the same will produce a rotative wiping action between the applicator and the cosmetic.

5. A device of the class described comprising an elongated outer receptacle having a longitudinal bore extending from one end of said receptacle, a closure for said end of said receptacle, means removably mounting said closure upon said receptacle requiring rotative movement between said receptacle and said closure to disengage them, an applicator rigid with said closure and extending into said bore when said closure is engaged upon said receptacle, an elongated inner container for holding a supply of cosmetic slidably mounted within said bore and having an open end disposed toward said one end of said receptacle, means urging said container toward said end of said bore to press the cosmetic into contact with said applicator, means interengaging said receptacle and said container to prevent relative rotary movement between them whereby rotation of said closure to disengage the same will produce a rotative wiping action between the applicator and the cosmetic, and stop means interengaging said receptacle and said inner container when said inner container has been moved to a position close to the open end of said bore for preventing passage of said container out of the open end of said bore.

6. A device of the class described, comprising an elongated outer receptacle having a longitudinal bore extending from one end thereof, an elongated inner container for holding a supply of cosmetic slidable within said bore and having a cross section sufficiently smaller than the cross section of said bore to provide an annular space between said container and said bore, radially extending flange means upon said container adjacent the end thereof disposed toward the open end of said receptacle, a spring in said receptacle bore extending into said space between said container and said bore and engaging said flange means for urging said container toward the open end of said receptacle, a closure for the open end of said receptacle, and an applicator rigid with said closure disposed to project into said receptacle bore to engage the contents of said container and to depress said container when said closure is in place on said receptacle.

7. A device of the class described, comprising an elongated outer receptacle having a longitudinal bore extending from one end thereof, an elongated inner container for holding a supply of cosmetic slidable within said bore and having an external dimension sufficiently smaller than the cross section of said bore to provide an annular space about said container, radially extending flange means on said container extending across the space between said container and said bore, spring means in said receptacle bore extending into said space between said container and said bore and engaging said flange means for urging said container toward the open end of said receptacle, stop means adjacent the open end of said receptacle extending laterally into said bore to engage said flange means to limit the movement of said container toward the open end of said bore, a closure for the open end of said receptacle, and an applicator rigid with said closure disposed to project into said receptacle bore to engage the contents of said container and to depress said container when said closure is in place on said receptacle.

8. A device of the class described, comprising an elongated outer receptacle having a longitudinal bore extending from one end thereof for receiving and holding a supply of cosmetic material, a closure for said end of said receptacle, an applicator mounted upon said closure for movement between a contracted position disposing said applicator just within the open end of said bore to an extended position disposing said applicator at the opposite end of said bore, and spring means urging said applicator to said extended position whereby said applicator will be urged into pressure contact with the cosmetic in said receptacle as the cosmetic is consumed.

THORPE W. DEAKERS.
MARGUERITE SCHMUCKER,
*Administratrix of the Estate of Lloyd A. Schmucker, Deceased.*